United States Patent [19]
Haddad

[11] 3,729,937
[45] May 1, 1973

[54] ENGINE EXHAUST REACTOR AND METHOD OF MAKING

[75] Inventor: Mitchell J. Haddad, Detroit, Mich.
[73] Assignee: General Motors Corporation, Detroit, Mich.
[22] Filed: Dec. 17, 1971
[21] Appl. No.: 209,149

[52] U.S. Cl. .................60/298, 60/272, 60/282, 60/305, 60/323, 164/98
[51] Int. Cl..............................................F01n 3/10
[58] Field of Search....................60/282, 272, 323, 60/298, 304, 305, 303, 302; 164/98, 111, 132

[56] References Cited
UNITED STATES PATENTS 3,568,723  3/1971  Sowards .................164/98
3,635,031  1/1972  Haddad ..................60/298

Primary Examiner—Douglas Hart
Attorney—J. L. Carpenter et al.

[57] ABSTRACT

In preferred embodiments, exhaust reactors for internal combustion engines are formed as large volume manifolds having cast iron outer shells containing baffled sheet metal inner liners spacedly supported within their respective outer shells to provide an insulating air space between the walls of the inner liner and outer shell. Means for providing a flow of air through the insulating space may be provided with the preheated air being delivered through means, internal or external of the manifolds, to the incoming exhaust gas stream for mixture therewith to aid combustion of the exhaust products. Construction of such reactors includes the steps of fabricating a metal inner liner, forming a sand core along the outer surfaces of the liner exclusive of certain supporting portions, casting a metal outer shell around the sand core and sheet metal liner so as to provide a protecting and supporting housing, and removing the core sand from the insulating space, preferably by shaking it out through openings formed in the outer shell.

4 Claims, 7 Drawing Figures

Patented May 1, 1973
3,729,937
2 Sheets-Sheet 1
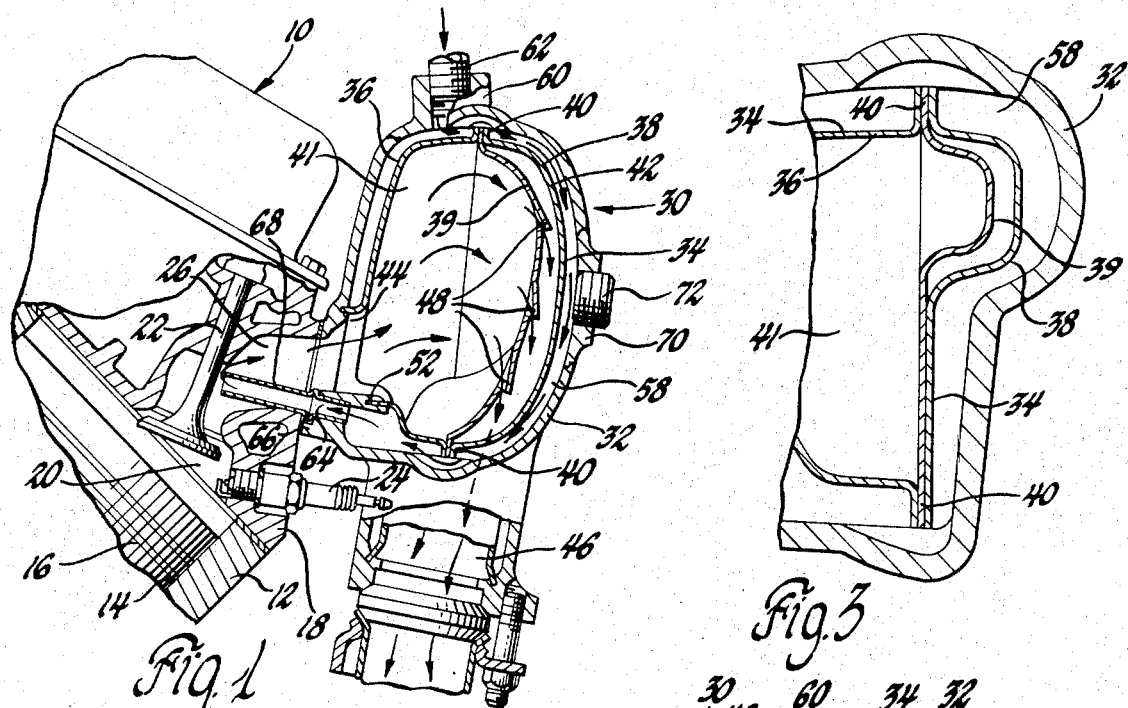
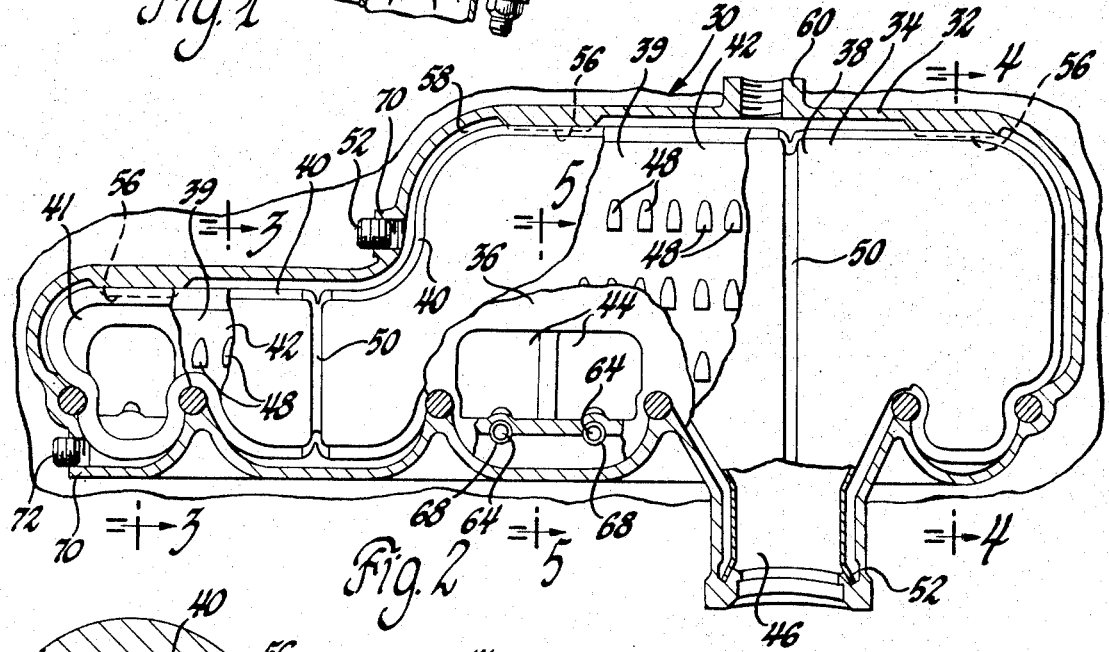
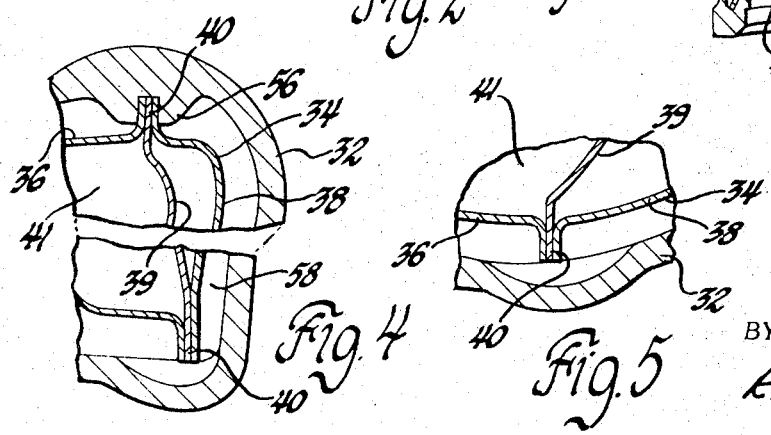
INVENTOR.
Mitchell J. Haddad
BY
Robert J. Outland
ATTORNEY INVENTOR.
Mitchell J. Haddad
BY
Robert J. Outland
ATTORNEY

ENGINE EXHAUST REACTOR AND METHOD OF MAKING

BACKGROUND OF THE INVENTION

This invention relates to exhaust gas reactors for use with internal combustion engines and, more particularly, to the construction and method of making durable and efficient insulated exhaust reactors at reasonable cost.

It is known in the internal combustion engine art to utilize an exhaust gas reactor in the engine exhaust system to further the burning of combustibles remaining in the exhaust gases after they leave the combustion chamber to thereby substantially reduce emissions of hydrocarbons, carbon monoxide, and the like from an operating engine. Such exhaust reactors may take the place of the usual engine exhaust manifold and provide an enlarged chamber that is insulated and arranged to form an extended flow path for the passage of exhaust gases therethrough.

The combination of low heat loss and extended residence time of the exhaust gases provided by such reactor manifolds encourages substantially complete combustion of any remaining combustible mixture to take place during passage of the exhaust gases through the manifold. Where necessary, additional air may be supplied to the engine exhaust system to mix with the exhaust gases and provide a mixture suitable for substantially complete combustion within the manifold reactor.

SUMMARY OF THE INVENTION

The present invention provides practical constructions and methods of making exhaust reactors for the above-described purposes. The constructions involve the use of a supporting and protecting outer shell, preferably of cast iron, which surrounds, supports and protects a non-porous inner liner, preferably of sheet metal such as stainless steel, the reactors being insulated by an insulating space formed between the inner liner and outer shell. In a preferred form of the invention, the supplemental combustion air for burning the exhaust emissions in the reactor is passed through the insulating space to cool the walls of the manifold and preheat the incoming combustion air. Alternatively, the insulating space may be closed to provide a dead air space, filled with another insulating medium, or evacuated and sealed to provide improved insulating qualities.

Manufacture of exhaust reactors in accordance with this invention is accomplished by first fabricating an inner shell and then applying to the outer surfaces thereof to be insulated a layer of core sand which is dried or baked to form a sand core. The outer iron casing is then cast around both the core sand layer and the inner liner with protruding or exposed portions of the liner being engaged by and preferably mechanically interlocked with the cast outer shell. In this way, the relative positions of the liner and outer shell are positively fixed. Openings provided in the outer shell, either during the casting process or subsequently, are then utilized to shake out the sand from between the inner liner and outer shell, leaving an insulating space therebetween. The shake-out openings are then plugged and/or connected with suitable means for passing cooling and combustion air through the insulating space for delivery to the reactor interior.

The preferred constructions provide practical and efficient exhaust reactors which are relatively inexpensive to manufacture and yet are highly reliable. These and other advantages of these constructions and methods of manufacture will be more apparent from the following description of certain preferred embodiments of exhaust reactors formed according to the invention, taken together with the accompanying drawings.

BRIEF DESCRIPTION OF THE DRAWINGS

In the drawings:

FIG. 1 is a transverse cross-sectional view of an internal combustion engine in combination with a preferred embodiment of exhaust reactor formed according to the invention;

FIG. 2 is a longitudinal cross-sectional view of the exhaust reactor of FIG. 1 having fragmentary portions of the view taken in various planes to better illustrate the construction of the reactor;

FIGS. 3, 4 and 5 are fragmentary transverse cross-sectional views taken in the planes indicated by the lines 3—3, 4—4 and 5—5, respectively of FIG. 2 and illustrating certain details of the reactor construction;

DESCRIPTION OF THE PREFERRED EMBODIMENTS

Figure 6:
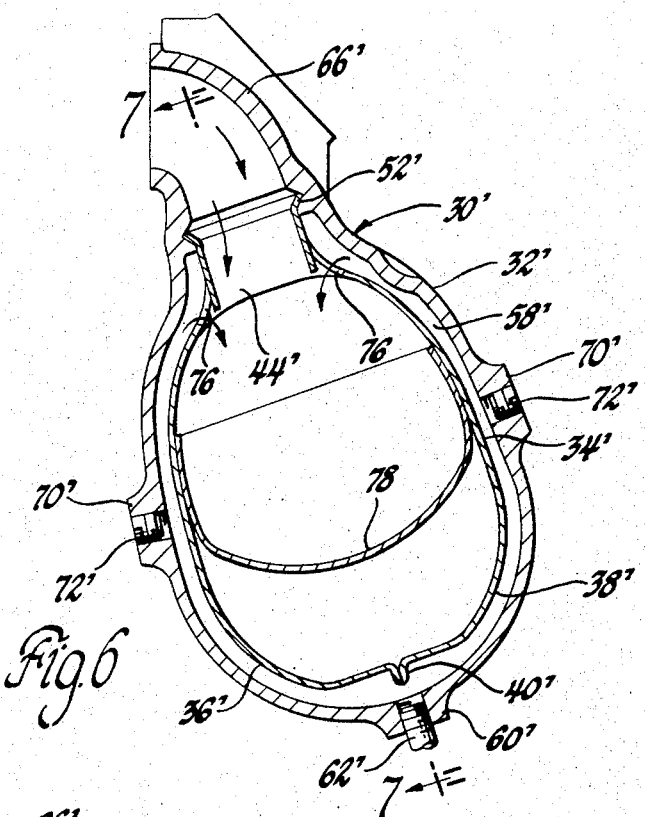
FIG. 6 is a transverse cross-sectional view of an alternative embodiment of exhaust reactor formed according to the invention.

In the drawings, numeral 10 generally indicates an internal combustion engine of conventional construction, including a cylinder block 12 having a plurality of cylinders 14 receiving pistons 16. A cylinder head 18 is mounted along the upper portion of the block 12 and closes the upper ends of the cylinders, defining therewith a plurality of combustion chambers 20.

Each cylinder head is provided with a plurality of inlet valves, not shown, and exhaust valves 22 which are actuated to respectively control the admission of fuel mixtures to and the exhaust of combustion products from the combustion chambers 20. Spark plugs 24 are provided for each cylinder to initiate combustion in the chambers 20 in a conventional manner. An exhaust port 26 is provided for each combustion chamber through which the exhaust products leave the cylinder head upon opening of the respective exhaust valve 24.

In order to provide means for completing the burning of combustibles which may be present in the exhaust gases, the engine 10 is provided with an exhaust reactor manifold formed according to the present invention and generally indicated by numeral 30. Manifold 30 preferably comprises a unitary cast iron outer shell 32 surrounding and supporting a stainless steel inner liner 34 that is spaced interiorly of the outer shell so as to define an insulating space surrounding substantially all portions of the inner liner.

In the embodiment of FIGS. 1 – 5, the main portion of the inner liner is formed of inner and outer sheet metal halves 36, 38, respectively. An outwardly curved sheet metal baffle 39 extends vertically and horizontally of the liner interior and is secured to the two liner halves at a flanged seam 40. The seam is preferably welded to provide a gas-tight chamber within the liner which is divided by the baffle into an inlet portion 41 and an outlet portion 42. Liner 34 includes a plurality of inlet openings 44 in its inner half 36 and a single outlet opening 46 extending downwardly from its lower surface, the openings 44, 46 being connected through a plurality of louvered openings 48 provided in the baffle 39.

A number of generally circumferential indentations 50 are provided in the liner intermediate the inlet port openings 44 in order to give some longitudinal flexibility. This reduces stresses due to longitudinal expansion and contraction of the liner caused by the large temperature changes to which it is exposed. Although any suitable non-porous material may be used for the liner and baffle, I prefer to use stainless steel because of its ability to withstand high combustion temperatures and corrosion from exhaust products.

The liner inlet and outlet ports are provided with flange portions 52 which protrude into the cast iron outer shell 32. In addition, portions of the liner flanged seam 40 are lockingly engaged by inwardly extending portions 56 of the outer shell 32 to assist the action of the port flanges 52 in securely locking the liner 34 in position within the outer shell 32.

In its finished form, the outer shell, which is preferably of cast iron but alternatively may be made of other suitable material, completely surrounds the inner liner, supporting it at portions 52 and 56, as previously mentioned, and protecting it from external damage. An insulating space 58 is provided between the walls of the inner liner and outer shell at all points except the supporting locations, such as 52 and 56. This insulating space may be sealed to provide a dead air space or could be filled with some other insulating material. Alternatively, the space could be evacuated and sealed to improve its insulating qualities.

In the embodiment described, however, insulating space 58 is utilized as a flow path for supplemental air being delivered to the interior of the manifold inner shell for combustion with the engine exhaust gases. For this purpose, the outer shell 32 is provided with a boss 60 having a threaded opening to which an air inlet fitting 62 is connected to deliver air from a suitable air pump, connected with and driven by the engine. From the point of entry, the supplemental air passes around the exterior of the inner liner through the insulating space 58 where it serves the purpose of keeping the outer shell relatively cool, while picking up heat from the inner liner 34. From this space, the preheated air is delivered through openings 64 in the cast inlet flanges 66 of the outer shell and extension tubes 68 to the interior of the engine exhaust ports 26, where the air mixes with the outgoing exhaust gases and flows with them through the liner inlet ports 44 and into the interior of the inner liner for combustion.

In addition to the opening in boss 60, a number of additional bosses 70 are provided at various locations of the outer shell. These bosses include threaded shake-out openings which may be closed by plugs 72. The bosses and shake-out openings 70 are utilized in the manufacturing process, as will now be described.

In manufacture of an exhaust reactor according to the present invention, the first step is the construction of the inner liner with its baffles, which may be accomplished by known manufacturing methods. Following the forming and assembly of the components into an inner liner assembly, the next step is to form a suitable casting core around the inner liner covering the entire surface with the exception of those portions where the inner liner is to be interlocked with and/or supported by the outer shell. These portions are left to protrude from the casting core material. Although any suitable material may be used for the purpose, I prefer to use as a casting core a core sand of the type commonly used in forming cast iron cylinder heads, cylinder blocks, and the like, for internal combustion engines. The core sand is preferably applied to the inner liner in a suitable mold and is baked to give it sufficient qualities of hardness to withstand the subsequent casting process.

Following application of the casting core to the inner liner, the unitary cast iron outer shell is formed around the core and inner liner using conventional casting processes. Shake-out openings may be provided in bosses 70 and 60 during the casting step, or they may be machined in the bosses subsequent to casting. In either event, the next step is the removal of the sand core material from the space between the inner liner and outer shell. This may be accomplished by shaking the casting to break up the relatively fragile sand core into granular particles which will fall out the shake-out holes. If necessary, clean-out solutions, air pressure or mechanical means may be used to aid in removing the sand or other core material from the assembly, leaving the desired insulating space between the inner liner and outer shell, except at the support points where the inner liner is interlocked with and supported by the outer shell. Final machining of the assembly, followed by plugging of the unneeded shake-out openings and application of additional components such as extension tubes 68, are the final steps in providing a finished reactor assembly.

Figure 7:
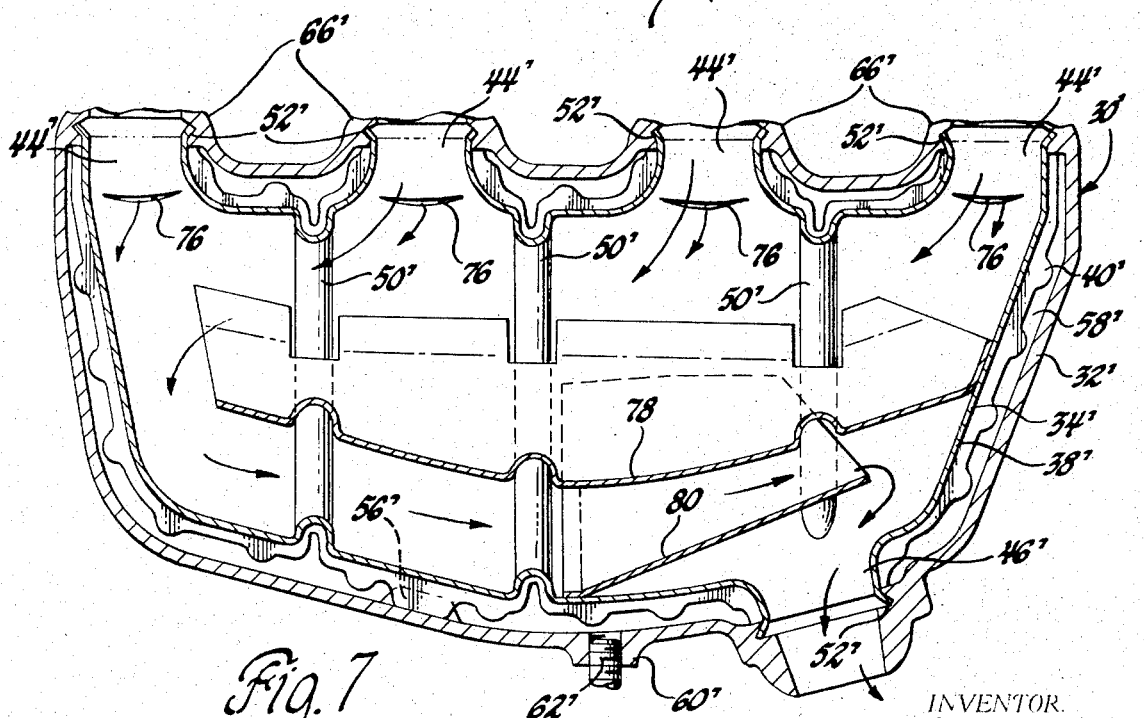
FIG. 7 is a longitudinal cross-sectional view of the reactor of FIG. 6, taken generally in the plane indicated by the line 7—7 of FIG. 6.

Referring now to FIGS. 6 and 7, there is shown an alternative embodiment of exhaust reactor manifold which is illustrated to indicate one of the many forms in which the principles of the present invention may be utilized. While differing in form, the various portions of the alternative embodiment largely duplicate those of the embodiment previously described and, accordingly, primed reference numerals are used to identify those components which are similar to those of the previously described construction.

A primary difference between the two embodiments is the provision of louvre-like openings 76 in the walls of the inner liner 34' on opposite sides of each inlet opening 44'. Openings 76 provide for the passage of supplemental air from the insulating space 58' into the interior of the inner liner for mixing and combustion with the exhaust gases. One other difference in the construction is in the number and positioning of the baffles 78, 80 which are located to meet the needs of the particular manifold embodiment disclosed. In other ways the general construction and method of manufacture of the alternative embodiment of FIGS. 6 and 7 is comparable to that of the first described embodiment.

While the invention has been described by reference to certain specific embodiments chosen for purposes of illustration, there is no intention to limit the inventive concepts to the particular embodiments shown, but, rather, the invention should be given the full scope permitted by the following claims.

I claim:

1. An exhaust reactor for an internal combustion engine, said reactor comprising an inner passage defining liner of non-porous material capable of withstanding combustion temperatures, a unitary cast outer shell surrounding said inner liner and interlockingly supporting said liner at predetermined locations thereof, the remainder of said liner being spaced inwardly of said shell to define therewith an insulating space, said outer shell having inlet and outlet ports for exhaust gases to enter into and exit from said liner passage and means for connecting said inlet and outlet ports with such engine and an exhaust system respectively and means provided in at least one of said inner liner and outer shell members to allow for the removal of casting core material from said insulating space during manufacture of said reactor.

2. An exhaust reactor manifold for an internal combustion engine, said manifold comprising an inner liner formed of high temperature resistant sheet metal and defining a gas flow passage with inlet and outlet openings, a unitary cast iron outer shell surrounding said inner liner and interlockingly supporting said liner at predetermined locations thereof, the remainder of said liner being spaced inwardly of said shell to define therewith an insulating space, said outer shell having inlet and outlet ports connecting with said liner openings and means at said ports for connecting said manifold with such engine and an exhaust system, respectively and air opening means through at least one of said outer shell and inner liner to provide for the inlet of cooling air into said insulating air space and the transfer of preheated air from said insulating air space for delivery into said liner-defined passage for combustion with the exhaust gases of such engine, at least certain of said air opening means being arranged to also permit removal therethrough of casting core material from said insulating space during manufacture of said manifold.

3. The method of constructing an insulated exhaust reactor for use with an internal combustion engine, said method comprising the steps of fabricating an inner passage defining liner of non-porous material capable of withstanding combustion temperatures, forming around said inner liner an intermediate layer of material capable of acting as a casting core, portions of said inner liner being left uncovered by said intermediate layer, casting a supporting and protecting outer shell around said intermediate layer and said inner liner, with said outer shell engaging said uncovered portions of said inner liner to support the other portions of said liner in spaced relationship with said cast outer shell independently of said intermediate layer, and removing said intermediate layer of core material from between said inner liner and outer shell.

4. The method of constructing an air insulated exhaust reactor for use with an internal combustion engine, said method comprising the steps of fabricating an inner passage defining liner of high temperature resistant sheet metal, said liner having a plurality of protruding portions, forming an intermediate layer of adherent core sand around said inner liner except for said protruding portions, casting a supporting and protecting iron outer shell around said sand layer and said sheet metal liner, said outer shell being mechanically interlocked with said liner protruding portions to support said liner in spaced relationship with the other portions of said liner independently of said sand layer, forming shake-out openings in said outer shell to provide for removal of said core sand layer, removing said sand layer from between the inner liner and outer shell, and plugging said shake-out openings.

* * * * *